(12) United States Patent
Zahariev

(10) Patent No.: US 11,953,145 B2
(45) Date of Patent: Apr. 9, 2024

(54) TRIPOD FOR SHOOTING EQUIPMENT

(71) Applicant: Stoyko Georgiev Zahariev, Sofia (BG)

(72) Inventor: Stoyko Georgiev Zahariev, Sofia (BG)

( * ) Notice: Subject to any disclaimer, the term of this patent is extended or adjusted under 35 U.S.C. 154(b) by 93 days.

(21) Appl. No.: 17/778,840

(22) PCT Filed: Feb. 21, 2020

(86) PCT No.: PCT/BG2020/000009
§ 371 (c)(1),
(2) Date: May 21, 2022

(87) PCT Pub. No.: WO2021/119767
PCT Pub. Date: Jun. 24, 2021

(65) Prior Publication Data
US 2023/0020970 A1 Jan. 19, 2023

(30) Foreign Application Priority Data
Dec. 18, 2019 (BG) ........................................ 113045

(51) Int. Cl.
*F16M 11/34* (2006.01)
*G03B 17/56* (2021.01)

(52) U.S. Cl.
CPC ........... *F16M 11/34* (2013.01); *G03B 17/561* (2013.01)

(58) Field of Classification Search
None
See application file for complete search history.

(56) References Cited

U.S. PATENT DOCUMENTS

| | | | | | |
|---|---|---|---|---|---|
| 2,333,501 | A | * | 11/1943 | Whitman | F16M 11/16 248/188 |
| 2,703,691 | A | * | 3/1955 | Minnis | F16M 13/00 396/428 |
| 4,706,916 | A | * | 11/1987 | Cullmann | F16B 7/1463 248/407 |
| 6,413,168 | B1 | * | 7/2002 | McKendry | F16M 13/04 396/419 |
| 9,903,528 | B1 | * | 2/2018 | Hatch | F16M 11/26 |
| 2004/0155159 | A1 | * | 8/2004 | Tiffen | F16M 11/2014 248/168 |
| 2014/0301730 | A1 | * | 10/2014 | Johnson | F16M 11/06 396/428 |
| 2016/0116103 | A1 | * | 4/2016 | Gabrielli | F16M 11/04 248/125.8 |
| 2018/0324360 | A1 | * | 11/2018 | Gabrielli | F16M 11/16 |
| 2021/0190261 | A1 | * | 6/2021 | Warner | F16M 11/16 |
| 2023/0022365 | A1 | * | 1/2023 | Fiore | F16B 7/1463 |

* cited by examiner

*Primary Examiner* — Rodney E Fuller
(74) *Attorney, Agent, or Firm* — INVENTA CAPITAL PLC

(57) ABSTRACT

A tripod has three adjacent telescopic legs with identical locking mechanisms connected to a handle located above the central support element. The handle actuates the locking mechanisms simultaneously and independently of one another, whereby the legs can be telescopically adjusted from the free state to the locked position in the desired position when unfolding or folding the tripod. Locking mechanisms provide stability when loading the tripod. The telescopic legs of the tripod are pivotally connected to the central support element, so the different angles of the legs do not affect the effective operation of the locking mechanisms.

1 Claim, 5 Drawing Sheets

TRIPOD FOR SHOOTING EQUIPMENT

FIELD OF THE INVENTION

This invention relates to a tripod for a shooting equipment that will find application in both the shooting industry and for personal purposes, and in particular for the installation of video or photographic equipment, a camera or other optical instrument.

BACKGROUND OF THE INVENTION

The conventional type of tripods are used for temporary fixed support of television cameras, cameras, luminaires or other equipment. They have telescopically extendable legs which at their upper ends are pivotally attached to a central support, which remains fixed and is supported on the legs of the tripod. A tripod is a mobile product that must be comfortable to operate and a reliable base for expensive equipment that is mounted on it. The conventional type of tripods require more time in preparation for work, sometimes physical effort. When extending the leg sections of many tripods, it is necessary to rely on a separate eccentric lock or screw rotation for each telescopic section.

This takes a long time because each section of the three legs must be manually unlocked or locked. When a television team is working on event, choosing a camera angle, changing perspective, and speed are of primordial importance. Working on rough terrain and moving the tripod results in a new and slow adjustment of the tripod, as well as levelling, on the horizontal plane, the video or photo head mounted on it.

The Sachtler company offers its tripod, which is equipped with three locks at the top of the tripod under the central support, which control the telescopic sections simultaneously. In order to stretch the sections of the tripod, it is necessary to release the three locks simultaneously and lock them simultaneously. This somewhat facilitates the unfolding of the sections, but the additional manual manipulation remains to level the horizontal plane of the video head mounted on it.

SUMMARY OF THE INVENTION

It is an object of the invention to provide a tripod for shooting equipment that provides both speed and convenience of operation, as well as security of loading and reliability during operation of the tripod.

The task was solved by creating a tripod for the shooting equipment, which includes a mounting plate for mounting video or photo equipment and three adjacent legs. According to the invention, each leg is telescopic and consists of a lower and upper section, with a restraint attached at the upper end of the lower section connecting the lower to the upper section. At its lower end, the lower section is connected to a supporting heel with a hinged ear, with which it is connected to a hinged element and a restraining element.

A triple bracket is mounted along the longitudinal axis of the restraining element. The lower end of the lower section is secured to the support heel on one side by a threaded coupling and, on the other side, by a threaded connection, a support rod is attached, placed in the lower section. The upper end of the upper section is fixedly connected to a basic hinged element which is connected to a central support element, with a handle mounted between the fastening plate and the central support element with three ears.

In the central support element, a tensioner with three other ears is placed. The underside of the central support element is enclosed by a lower element provided with a cylindrical portion to guide the tensioner. The main hinged element is provided with a pass-through axial opening connecting the legs of the tripod to the ears of the central support element. The lower end of the upper section is connected to a collet having a pass-through axial opening and two opposite inner conical surfaces, with a rod in the axial opening also provided with two opposite outer conical surfaces.

At its lower end, the rod is provided with a radial pass-through opening located between the supports, and in the radial opening of the rod there is a locking lever with a pass-through axial opening whose centre intersects the longitudinal axis of the rod. Between the supports, a spring is located on a sleeve connected to the rod connected to the lower part of a connecting tube element, the upper part of which is connected to a hinge with bearing. The hinge is located in an opening of another hinged ear of the tensioner.

The advantage of the created tripod is that its action is carried out with only one manipulation of the handle, which allows complete control when unfolding and folding the tripod.

In addition, the handle activates the locking mechanisms built into the telescopic legs.

When it is rotated, the locking mechanisms are released and each of the legs of the tripod is independent of the other and can take its position, after which they can be locked. Independent positioning of the tripod legs and easy operation gives the advantage of quick adjustment of the tripod.

BRIEF DESCRIPTION OF THE FIGURES

This invention is illustrated in the accompanying drawings, where.

DETAILED DESCRIPTION OF EMBODIMENT OF THE INVENTION

Figure 1:
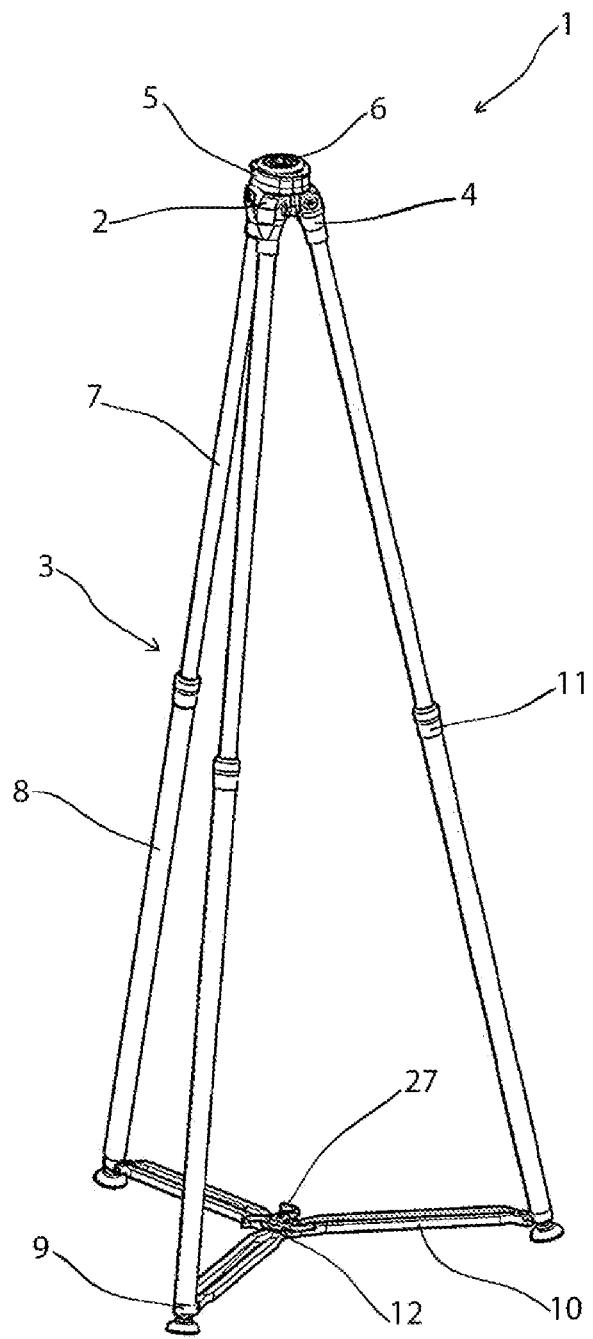
FIG. 1 is an axonometric view of a tripod in the open position and with unfolded sections.
Figure 2:
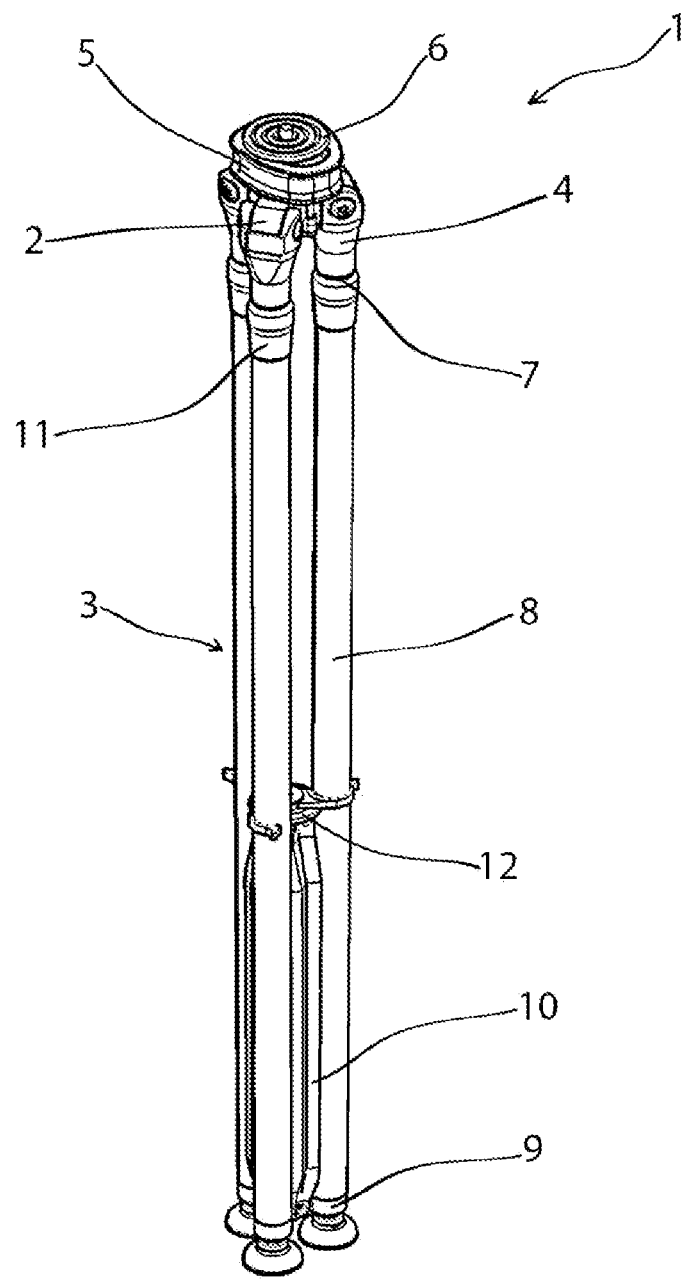
FIG. 2 is an axonometric view of a tripod with legs retracted to the base and sections retracted.

The created tripod 1 for shooting equipment shown in FIGS. 1 and 2 includes three adjacent telescopic legs 3, each of which consists of a lower 8 and an upper 7 section. At the upper end of the lower section 8, a restraint 11 is attached, which by means of threaded couplings connects the lower section 8 with the upper section 7.

At its lower end, the lower section 8 is connected to a support heel 9 with a hinged ear 59, with which it is connected to a hinged element 10 and a restraining element 12. The restraining element 12 and the hinged element 10 limit the angular range of extension of the legs 3 relative to the central support element 2. The fixation of the legs 3 is carried out by a triple bracket 27 mounted centrally along the longitudinal axis of the restraining element 12. In radial rotation, the triple bracket 27 grips and secures the lower section 8 of the legs 3 when the tripod 1 is retracted so that it be suitable for transportation. To the support heel 9, the lower end of the lower section 8 is fastened on one side by a threaded coupling, and on the other, by a threaded connection, a support rod 23 located in the lower section 8 is attached. The support rod 23 serves to support the upper section 7 and all associated locking elements at the upper part of the tripod 1.

At its upper end, the upper section 7 is fixedly connected to the main hinged element 4, which is connected to the central support element 2. An operating handle 5 is mounted between the central support element 2 and the mounting plate 6 for mounting video or photo equipment. The mounting plate 6 is provided with an outer thread 28 at its top, to which video or photo equipment is mounted, and an outer thread 29 at its bottom. The operating handle 5 has a pass-through axial opening and an internal thread 30, and the central support element 2 has three ears 32, as well as an pass-through axial opening 31. In the central support element 2 is housed a tensioner 13, which is a cylindrical element with a pass-through axial opening 33 and an external thread 34, as well as three other ears 35 for pivoting and a pass-through radial opening therein 26. The underside of the central support element 2 is closed by a lower element 14 provided with a cylindrical part 36 and an internal thread 37. The lower element 14 is connected to the central support element 2 by bolts 15. The outer surface of the cylindrical portion 36 serves as a guide for the tensioner 13 in its axial opening 33.

Figures 3, 3A, 3B:
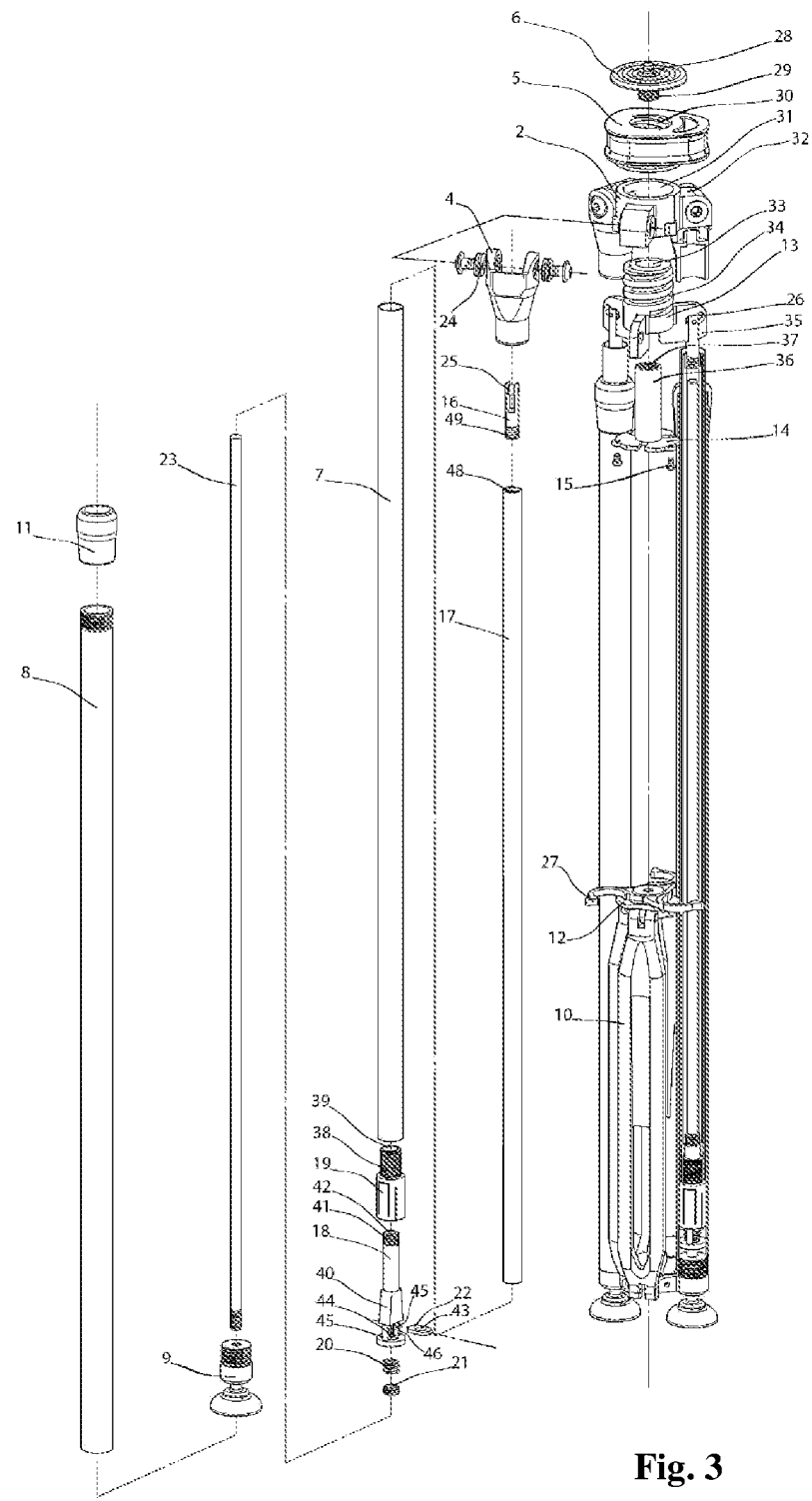
FIGS. 3, 3a and 3b are axonometric views of the structural elements of the tripod and a longitudinal section of one leg.
Figure 4:
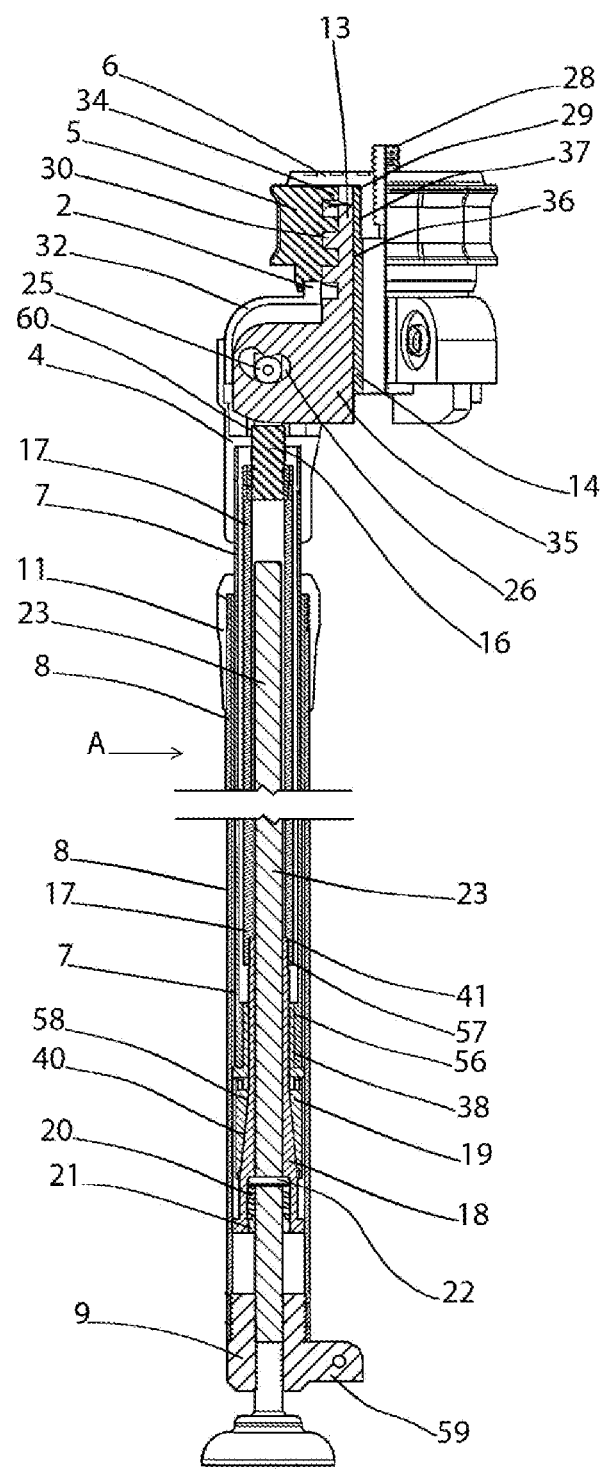
FIG. 4 is a side view of the mechanism in the unlocked position at the top and bottom of one leg of the tripod.
Figure 5:
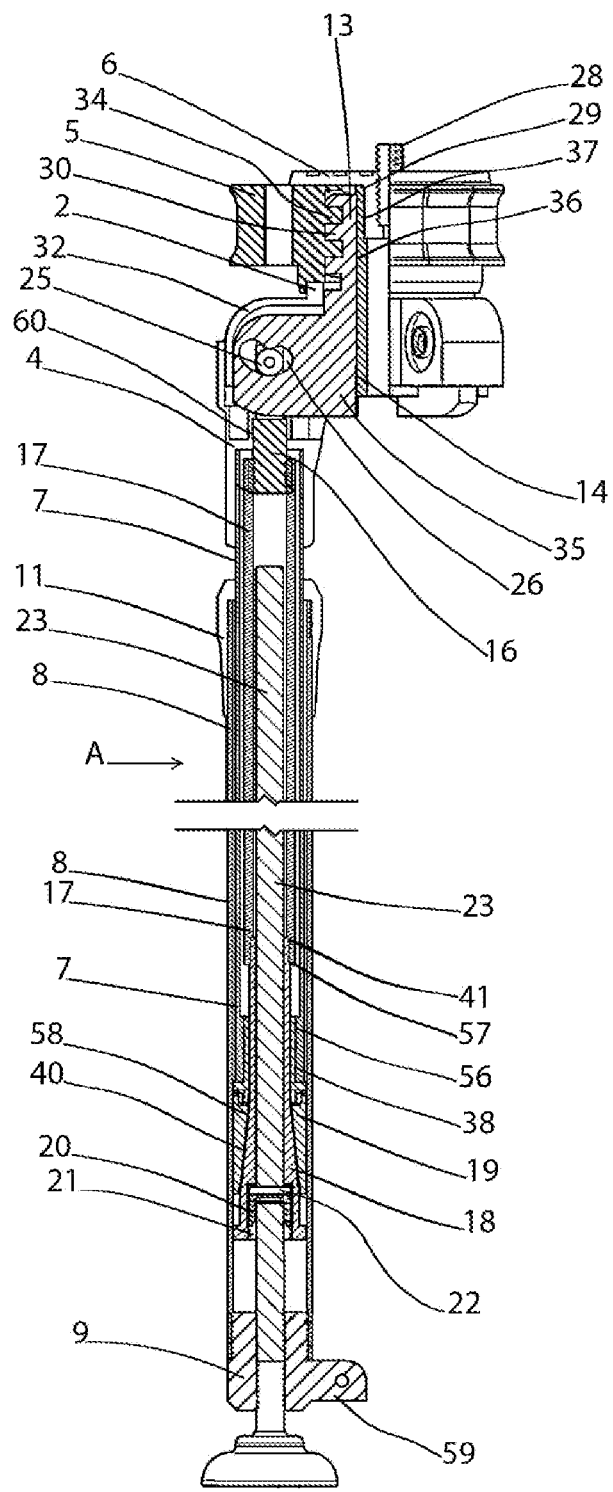
FIG. 5 is a side view of the mechanism in the locked position at the top and bottom of one leg of the tripod.

As shown in FIGS. 3, 4 and 5, the main hinged element 4 is provided with a pass-through axial opening 60 connecting the legs 3 of the tripod 1 to the ears 32 of the central support element 2 by means of bolts 24. At its upper end, the upper section 7 is fixed to the main hinged element 4 and at its lower end is connected to the collet 19 by means of the threaded couplings 38 and 56 shown in FIG. 3, 4 and FIG. 5. The collet 19 has a pass-through axial opening 39 and two opposite inner cone surfaces 58, with a rod 18 housed in the axial opening 39 which also has two opposite outer cone surfaces 40, a pass-through axial opening 42 and an outer thread 41 at its upper end. At its lower end, the rod 18 has a radial opening 46 between the supports 45 and an internal thread 44. A locking lever 22 is provided between the supports 45 and the radial opening 46 of the rod 18, with a pass-through axial opening 43, the centre of which intersects with the longitudinal axis of the rod 18. Between the supports 45 also a spring 20 is located on a sleeve 21, which is connected by a thread to the rod 18. Thus, the sleeve 21 presses the spring 20, which in turn exerts a constant pressure on the locking lever 22. The rod 18, the locking lever 22, the spring 20 and the sleeve 21 enter through the pass-through opening 39 of the collet 19 until the outer conical surfaces 40 of the rod 18 adhering with the inner conical surfaces 58 of the collar 19, also shown in FIGS. 4 and 5. The rod 18 by means of a threaded coupling connects to the bottom of the connecting tube element 17, the upper part of which is also connected by a thread to a hinge 16 with bearing 25. The hinge 16 is located in an opening 26 of another hinged ear 35 from the tensioner 13.

The created tripod 1 is used as follows.

The tripod 1 has three adjacent telescopic legs 3 with identical locking mechanisms connected to the handle 5 located above the central support element 2. The handle 5 actuates the locking mechanisms simultaneously and independently of each other, wherein the legs 3 can be telescopically adjustable from free to locked position in desired position when unfolding or folding the tripod 1. Locking mechanisms provide stability when loading the tripod 1, as well as sealing between telescopic legs 3. The telescopic legs 3 of the tripod 1 are pivotally connected to the central support 2, so that the different angles of the legs 3 do not affect the effective operation of the locking mechanisms.

When the tripod 1 is unlocked, the telescopic upper 7 and lower 8 sections are in a free state and can move axially into each other. The radial rotation of the handle 5 moves the axially connected tensioner 13, the hinge 16 with the bearing 25, the connecting tube element 17 and the rod 18. The outer conical surfaces 40 of the rod 18 are adhered to the inner conical surfaces 58 of the collet 19, which is fixed and connected to the upper section 7. The locking lever 22 is located between the supports 45 of the rod 18 and is pressed by the spring 20. The arch between the two supports 45 of the rod 18 fixes the locking lever 22 in a perpendicular position with respect to the support rod 23, which passes freely through the pass-through axial opening 43 of the lever 22 through the axial opening 42 of the rod 18, in the axial opening 39 of the collet 19 and the connecting tube element 17.

When the tripod 1 is locked, the reverse radial rotation of the handle 5 drives axially all the connected elements and blocks the free axial movement of sections 7 and 8 into each other. The handle 5 lies on the central support element 2 and below the mounting plate 6. The lower element 14 with the outer surface of the cylindrical portion 36 is a guide of the tensioner 13. The threaded connection 29 and 37 connects the lower element 14 and the mounting plate 6, thereby securing the handle 5 and the tensioner 13 to the central support element 2. The handle 5, which has an internal thread 34, is connected to the outer thread 30 of the tensioner 13 and pulls it axially towards the top of the tripod 1. The tensioner 13 with the other ear 35 moves axially to the top of the tripod 1 the associated elements, namely: the bearing 25, which is located in the radial opening 26 of the other ears 35 and is connected to the hinge 16, as well as the connecting tube element 17 and the rod 18. The opening 26 in the other ear 35 serves to fit the elements at locking and their proper operation when changing the angular range of the legs 3 of the tripod 1. The axial movement of the rod 18 with the outer conical surfaces 40 in the collet 19 with the inner conical surfaces 58 results in a radial extension of the collar 19 which is fixed to the lower section 7. Radial expansion of the collar 19, in turn, leads to a seal between the tubular elements of the telescopic sections 7 and 8. The insertion of the rod 18 in the collet 19 changes the angle of the locking lever 22 relative to the support rod 23 in the pass-through axial opening 43. The locking lever 22 is shorter on one side, with which it enters the collet 19, and on the other side, the lever 22 has a support point in the lower part of the collet 19. Changing the angle of the locking lever 22 with respect to the support rod 23 causes the telescopic movement to be blocked between the elements connected to the upper section 7 and the elements of the lower section 8. The insertion of the rod 18 into the collet 19 increases the pressure of the spring 20 on the locking lever 22, thereby holding it to a locked position relative to the support rod 23 of the lower section 8. The weight of the mounting technique on the mounting plate 6 is directed to the bottom of the tripod through the upper section 7 to the locking lever 22, which leads to the locking of the lever 22 in the support rod 23.

The invention claimed is:

1. Tripod for shooting equipment, including a mounting plate for mounting video or photo equipment and three adjacent legs, characterized in that each leg (3) is telescopic and consists of a lower section (8) and an upper section (7), with a restraint (11) attached at the upper end of the lower section (8) connecting the lower section (8) to the upper section (7), and at its lower end the lower section (8) is connected to a support heel (9) with a hinged ear (59) to which a hinged element (10) is connected and a restraining element (12), along which a triple clamp (27) is mounted along the longitudinal axis, and, on the support heel (9), the lower end of the lower section (8) is fastened via a threaded coupling on one side, and on the other side the support rod (23) is fastened, placed in the lower section (8) via a threaded connection, wherein the upper end of the upper section (7) is fixedly connected to a main hinged element (4) which is connected to a central support element (2), with a handle (5) mounted between the mounting plate (6) and the central support element (2) with three ears (32) in which central support element (2) a tensioner (13) is fitted with three other ears (35), and the lower part of the central support element (2) is closed by a lower element (14) provided with a cylindrical part (36) serving as a guide for the tensioner (13), wherein the main hinged element (4) is provided with a pass-through axial opening (60), connecting the legs (3) of the tripod (1) to the ears (32) of the central support element (2), and the lower end of the upper section (7) is connected to the collet (19) having a pass-through axial opening (39) and two opposite inner conical surfaces (58), with a rod (18) placed in the axial opening (39), also provided with two opposite outer conical surfaces (40), and in its lower end the rod (18) is provided with a radial pass-through opening (46) located between the supports (45), and in the radial opening (46) of the rod (18) a locking lever (22) is placed with a pass-through axial opening (43), the centre of which intersects with the longitudinal axis of the rod (18), wherein between the supports (45) a spring (20) is located on a sleeve (21) connected to the rod (18) connected to the bottom of the connecting tube element (17), the upper part of which is connected to a hinge (16) with a bearing (25), the hinge (16) being located in an opening (26) to another hinged ear (35) of the tensioner (13).

\* \* \* \* \*